March 16, 1954  D. E. NORRIS  2,672,374
SOLIDS LIFT DISENGAGER
Filed July 19, 1951
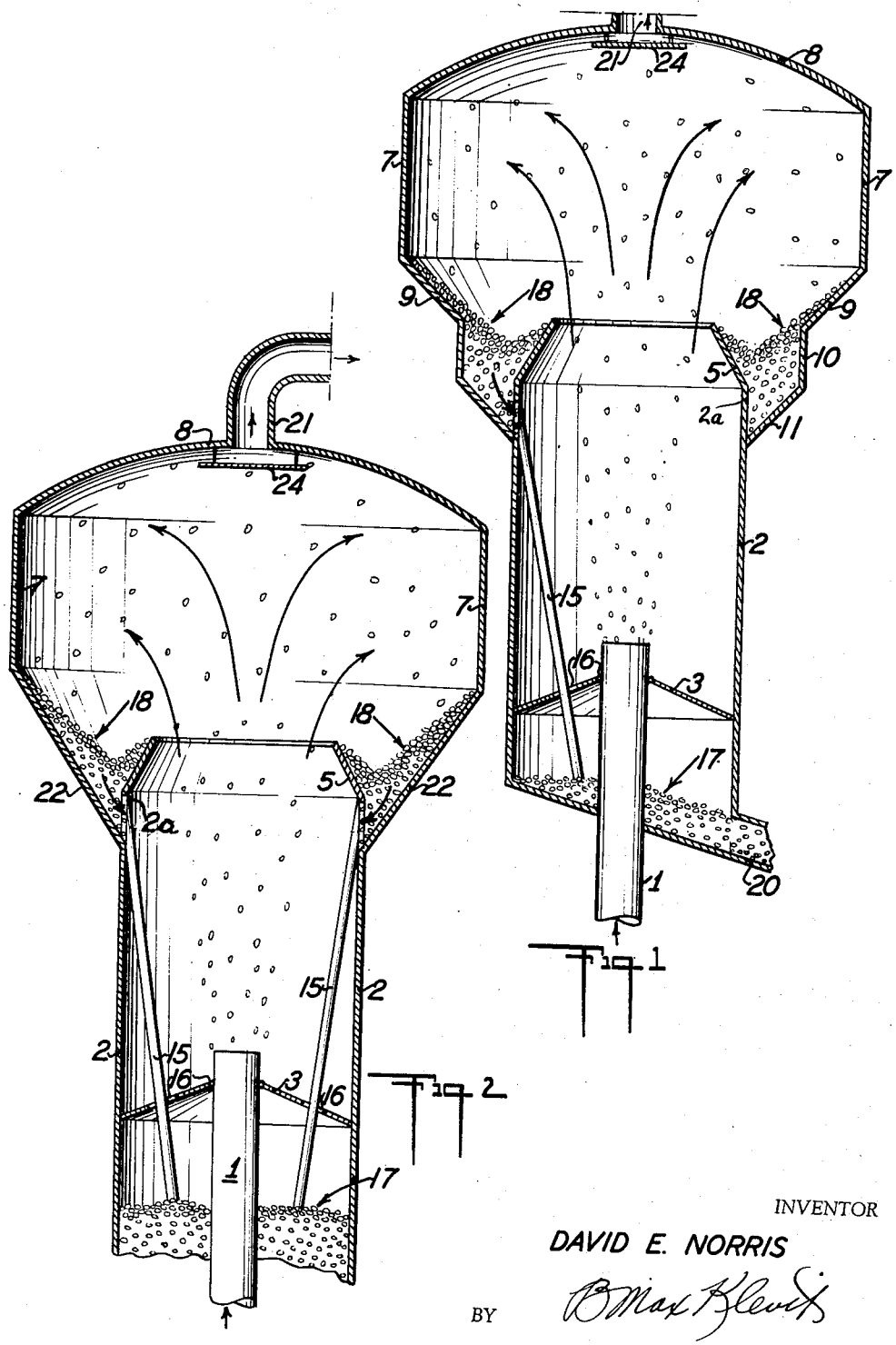
INVENTOR
DAVID E. NORRIS
BY
ATTORNEY Patented Mar. 16, 1954

2,672,374

UNITED STATES PATENT OFFICE 2,672,374

SOLIDS LIFT DISENGAGER

David E. Norris, Wynnewood, Pa., assignor to Houdry Process Corporation, Wilmington, Del., a corporation of Delaware Application July 19, 1951, Serial No. 237,597

5 Claims. (Cl. 302—59)

This invention relates to the prevention of attrition of particle-form catalysts which are employed in hydrocarbon cracking processes; and, more particularly, to a method and apparatus for controlling catalyst movement upon its discharge from the lift pipe of a gas elevator.

In systems for cracking hydrocarbons wherein the hydrocarbons are contacted with a granular or particle-form catalyst, there has been developed what is known as a moving catalyst process. This process involves initially contacting the hydrocarbons with a catalyst of the type referred to, followed by conveying the catalyst away from the reaction zone and into a regeneration zone wherein the coke which is formed on the catalyst during the reaction step is removed, the catalyst so regenerated then being reconveyed to the reaction zone for further contact with the hydrocarbons to be cracked. The solid materials with which this invention is concerned are those having an average particle size of 14 mesh or larger, and including coarse granules, as well as the typical commercial beads and whole pellets of 2 to 5 mm. diameter.

While older methods for moving the granular or particle-form catalyst between the reaction zone and the regenerating zone included mechanical means, such as bucket elevators, more recently it has been proposed to elevate the catalyst from a lower region of the system to an upper region thereof by means of a gas elevator. Elevators of this latter type comprise a hopper, an elongate vertically disposed lift pipe, and a disengaging chamber at the top of the latter. In operation, the catalyst particles are permitted to flow to the hopper, generally by gravity, as from a regeneration zone, forming a confined bed therein. The lift pipe of the gas elevator extends downwardly into the hopper and beneath the level of the confined bed. A suitable gas stream is introduced into the bed within the hopper and issues upwardly therefrom through the lift pipe, whereby the catalyst particles are impelled by, and carried along with, the gas stream. After traveling upwardly through the lift pipe, the gas and catalyst particles are discharged into a disengaging chamber, the particles falling by gravity to the bottom of the chamber and the gas being withdrawn separately from the chamber.

During the commercial operation of hydrocarbon cracking processes employing a gas elevator, attrition of the catalyst particles may develop, resulting in the formation of fines and loss of catalyst through removal from the system of these fines. One cause of the attrition of the catalyst has been found to be a result of the particles issuing from the gas elevator at a relatively high velocity and impinging upon the walls and particularly the top of the disengaging chamber. In the designing of equipment for use in the gas elevator system, the disengaging chamber therefore is usually of a sufficient size to prevent the majority of particles of catalyst issuing from the lift pipe from impinging on the walls and top with a degree of force which is sufficient to cause appreciable attrition. Another cause of catalyst attrition of greater consequence than impingement on the vessel walls and top is the contact of the particles at the completion of their free fall subsequent their separation from the elevating gas within the disengaging chamber.

This contact is of more serious consequence because all of the particles disengaged from the elevating gas within the disengaging chamber fall by gravity to a lower level for subsequent removal from the disengaging chamber and such particles are therefore all in greater or less degree subject to relatively abrupt termination of movement upon completion of their free fall. The kinetic energy of such particles at their peak velocity, i. e., termination of free fall, may thus be sufficiently great to result in appreciable attrition and the breaking down eventually to fine powder. Also, it has been found that catalyst particles having similar kinetic energy are appreciably more subject to attrition when their fall is terminated by a relatively rigid non-yielding surface such as a steel plate or the like than when their fall is terminated on a surface of catalyst even when such surface is of a relatively thin layer of catalyst.

In view of the fact that processes of the aforementioned type continually recycle the catalyst in such manner that it passes through the gas elevator system many times, it will be readily appreciated that, if even a small precentage of the particles strike the surface of the disengaging chamber at high velocities coupled with the effects of all of the particles falling through long distance, rates of attrition may result that are uneconomically high because of the necessity for replacing the fines thus produced with new catalyst of proper size.

The present invention contemplates the elimination, or material reduction, of the following defects in gas elevators of the class herein under consideration:

Excessive falling distances in the separator or disengaging chamber.

Impingement of falling catalyst on the side walls of the disengaging chamber.

Impingement of rising catalyst against the bottom of the dome of the disengaging chamber.

It is among the objects of the present invention to eliminate, or at least greatly reduce, the attrition of granular or particle-form catalyst employed in hydrocarbon cracking processes by cushioning its fall after it has been discharged from the upper end of the lift pipe of a gas elevator.

Another object is the attainment of the foregoing by permitting catalyst of the class described to discharge from the upper end of the lift pipe of the gas elevator and to fall downwardly by gravity onto a cushioning bed of catalyst without contacting any overhead confining housing or baffle.

Still another object is the attainment of the foregoing by the use of apparatus which is not only efficient in operation, but which is also inexpensive to manufacture, install, operate and maintain.

The foregoing and other objects will become more apparent after referring to the following specification and accompanying drawings wherein like reference numerals designate like parts and wherein:

Figure 1 is a fragmentary elevation, partly in section of a disengaging chamber of the type referred to earlier herein and which employs apparatus constructed in accordance with the teachings of the present invention; and Figure 2 is a view which is similar to that of Figure 1, and illustrates a modified form of the apparatus of the invention.

Referring more particularly to the drawings, the numeral 1 designates the vertically extending lift pipe of a gas elevator, the upper end of which communicates with a suitable separator or disengaging chamber.

According to the teachings of the present invention, the upper end of the lift pipe 1 extends concentrically into the lower end of a superposed cylindrical tube 2 of much greater diameter. The upper extremity of the lift pipe 1 passes through frusto-conical partition plate 3 which is supported on the inner surface of the cylindrical tube 2, the central opening of plate 3 being sufficiently large to permit free vertical movement of lift pipe 1 during the course of any longitudinal expansion or contraction thereof, and positioned with respect to the upper extremity of lift pipe 1 to be always therebelow.

The upper end of the cylindrical tube 2 is provided with a frusto-conical extension 5 which projects into the lower portion of the upper enlarged section of the separator or disengaging chamber for a purpose which will be later described.

The disengaging chamber is shown as comprising cylindrical tube 2 and an upper enlarged cylindrical main body portion 7, the diameter of which is considerably greater than the diameter of the cylindrical tube 2, together with a concavo-convex dome 8. The lower end of the cylindrical body portion 7 of the disengaging chamber connects with an inwardly sloping wall 9 to which, in turn, there is connected a depending cylindrical wall 10. The lower end of the cylindrical wall 10 connects with a depending lower inwardly sloping wall 11 which, in turn, connects with the outer surface of the cylindrical tube 2 at a position which is slightly below the lower end of the frusto-conical extension 5 of the latter.

Immediately above the lower end of the lower inwardly sloping wall 11, the wall of the cylindrical tube 2 is apertured to communicate with a plurality of catalyst transfer pipes (one of which is shown in Figure 1); each of said catalyst transfer pipes 15 extending downwardly through a suitable aperture 16 in the frusto-conical partition plate 3 to a bed of catalyst which is shown at 17.

According to the foregoing construction and arrangement, the pellets or particles of catalyst will be projected upwardly through and from the lift pipe of the gas elevator, through the superposed portion of the cylindrical tube 2, and through and from the restricted area provided by the frusto-conical extension 5 on the cylindrical tube 2. After moving through this restricted area, the pellets or particles enter into the upper body portion of the disengaging chamber which, as before stated, is of greatly increased size. In this manner, particles or pellets of catalyst lose their velocity and fall downwardly and collect within the pocket-like region formed by the inwardly sloping walls 9 and 11 and their intermediately disposed cylindrical connecting wall 10 and an upper portion of tube 2 and extension 5. The pellets or particles of catalyst thus collected are transferred by gravity down the catalyst transfer pipes 15 onto the lower catalyst bed 17, from which they are withdrawn for reuse through the outlet 20.

In the ordinary course of operation, due to varying particle size and distribution of velocity, some of the catalyst particles have less than average design velocity; whereupon such particles having low velocity fail to rise a sufficient distance to pass beyond the inwardly converging frusto-conical member 5 and, therefore, fall under the influence of gravity within cylindrical member 2 to the surface of frusto-conical member 3. To provide for the transfer of particles from the surface of member 3 to the lower region generally indicated at 17, suitable openings 16 are provided to permit the drainage of particles from the surface of member 3 to the lower catalyst surface 17 for commingling therewith and withdrawal through outlet 20 in common with all of the particles removed from the lower region of the separating or disengaging chamber.

Referring to Figure 2 of the drawings, a modified form of the apparatus of the present invention comprises the direct connection of the upper end of the cylindrical tube 2 with an outwardly flared sloping wall 22, in lieu of the combined elements 9, 10 and 11 of Figure 1. In addition, the modification of Figure 2 contemplates the provision of an upwardly extending apertured wall 2a for supporting the frusto-conical element 5, the lower end of wall 2a terminating adjacent the upper end of the cylindrical tube 2; thereby providing a compartment which is suitably apertured for communication with the catalyst transfer pipes 15.

In addition to the elements described hereinbefore, the apparatus of the present invention contemplates the provision of "chicken ladders," or gratings, on the inner surface of the walls 9 and 11 of Figure 1, and the single inwardly sloping wall 22 of Figure 2; the purpose of which is to retain a layer of catalyst pellets or particles to provide a cushion for the succeeding pellets or particles which fall downwardly thereon. The "chicken ladders" or similar device may be any suitable upwardly extending system of baffles or the like so sized and positioned as to retain a suitable layer of particles between the metallic supporting surface and the downwardly falling catalyst particles and are so constructed that after retaining a suitable depth of such particles the residual particles continuously fall onto the surface thus created and thereafter pass downwardly to the transfer line as by rolling, sliding or the like. The use of "chicken ladders" on the upper surface of frusto-conical member 3 is also within the scope of the invention.

The distance from the lower ends on the catalyst transfer pipes 15 to the under side of the frusto-conical partition plate 3 is sufficiently large to permit pellets or particles of catalyst to drain through openings 16 and thereby prevents an accumulation of particles on plate 3 to the extent where such accumulation would rise above the outlet of lift pipe 1 and cause interference with the emerging mixture of gas and solids. The lower catalyst bed 17 may be shallow as shown in Figure 1 or may be of greater depth as indicated in Figure 2 to provide a reservoir of catalyst of sufficient extent to minimize the effects of minor variations and fluctuations of flow of solids into and out of this particular portion of the circulating solids system.

In operation the particles or pellets of catalyst introduced into the rising gas stream in the lower portion of the lift pipe 1 are conveyed upwardly through the lift pipe and discharged into the disengaging chamber as before stated; the majority of the particles or pellets will have sufficient velocity ordinarily to travel only a relatively short distance beyond the upper extent of cylindrical vessel 2 and inwardly converging frusto-conical member 5, and are thereafter separated from the rising gas stream and are collected within the solids collecting reservoir or collection zone for ultimate downward transfer as hereinbefore described. Likewise such particles as do not emerge from cylindrical vessel 2 are collected as hereinabove described. Thus, according to the teachings of the present invention excessive fall of the pellets or particles is avoided by temporary collecting before they have an opportunity to fall to any extended and excessive distance. Gas disengaged from the solids is withdrawn from vessel 7 by any suitable means such as diagrammatically indicated around the baffling member 24 and through pipe 21.

The inner sloping wall, which is provided by the frusto-conical extension or element 5 within the disengaging chamber, is positioned at a minimum safe clearance from the path of rise of the catalyst. While this inner sloping wall might acceptably be metal, the invention contemplates more flexible substances, such as fiberglass cloth, etc.

While certain specific embodiments of the present invention have been shown and described, it will be readily understood by those skilled in the art that the same is not to be limited exactly thereto, since various modifications may be made without departing from the scope of the invention as defined in the appended claims.

What is claimed is:

1. In apparatus for pneumatic elevation of granular solids by gaseous fluid comprising an upright lift conduit discharging upwardly into a gas-solids disengaging vessel, the improvement wherein said vessel comprises a lower section of a diameter considerably greater than the lift conduit surrounding said conduit, and an upper section of a larger transverse dimension than said lower section, said upper section having a downwardly and inwardly sloping bounding wall intersecting the wall of said lower section, the wall of said lower section being extended upwardly into said upper section for a distance beyond said intersection, thereby forming an annular pocket between the sloping wall of said upper section and the extended portion of the wall of said lower section for temporarily retaining granular solids falling into said pocket; solids withdrawal openings in said extended portion of the wall communicating with said pocket, pipes leading from said openings to a discharge level in the lower part of said disengaging vessel below the outlet end of the lift conduit therein, means to withdraw solids from said vessel below said discharge level, and means to withdraw gas from said upper section.

2. Apparatus as defined in claim 1 including a partition plate in the lower section below the outlet end of the lift conduit and surrounding said conduit, said plate being located above said discharge level and being provided with openings therein permitting removal of solids falling onto said plate.

3. Apparatus as defined in claim 2 wherein the extended portion of the wall of said lower section is at least partly of frusto-conical shape.

4. In a system for circulating granular solids comprising an upright lift conduit discharging upwardly into an expanded gas-solids disengaging vessel wherein said solids are projected upwardly into said vessel to a considerable height above the discharge outlet of said lift conduit, means for reducing the maximum free fall velocity attainable by such granular solids in descending from an attained level of rise to a level below the discharge outlet of said lift conduit, thereby reducing impact attrition of said granular solids, said means comprising an annular trough at a level above the discharge outlet of said conduit and concentric therewith, said trough being arranged within said disengaging vessel so that its inner periphery lies outside of the periphery of the normal path of a stream of solids discharged from said lift conduit but within the lines of descent followed by falling solids, whereby falling solids are temporarily stopped by contact with an annular layer of such solids collected in said trough, conduit means for continuously withdrawing collected solids from the bottom of said trough and passing the same in compact flow directly to a collecting level below the discharge outlet of said lift conduit, means for withdrawing lift gas from said disengaging vessel and means for continuously discharging solids from the bottom of said disengaging vessel.

5. In apparatus for pneumatic elevation of granular solids by gaseous fluid comprising an upright lift conduit discharging upwardly into a gas-solids disengaging vessel, the improvement wherein said vessel comprises a lower section of a diameter considerably greater than the lift conduit and surrounding said conduit, and an upper section of larger transverse dimension than said lower section, the bottom of said upper section intersecting the external periphery of said lower section and the bottom wall of said lower section extending upwardly through the bottom of said upper section for a distance beyond said intersection thereby forming between said extending portion and said upper section an annular pocket for temporarily retaining granular solids falling into said pocket; at least one solids transporting conduit communicating with said pocket and discharging into the lower part of the disengaging vessel at a level below the discharge outlet of the lift conduit therein, means for withdrawing solids from said lower section below said level of discharge, and means for withdrawing gas from said upper section.

DAVID E. NORRIS.

References Cited in the file of this patent

UNITED STATES PATENTS

| Number | Name | Date |
| --- | --- | --- |
| 1,498,630 | Jensen | June 24, 1924 |
| 2,106,869 | Falkenstein | Feb. 1, 1938 |
| 2,435,927 | Manning | Feb. 10, 1948 |
| 2,449,601 | Gohr | Sept. 21, 1948 |